United States Patent
Farnsworth et al.

(10) Patent No.: US 9,749,321 B2
(45) Date of Patent: Aug. 29, 2017

(54) SYSTEM FOR MULTI-POINT PUBLICATION SYNDICATION

(71) Applicant: Prolifiq Software Inc., Beaverton, OR (US)

(72) Inventors: Jeffrey Michael Farnsworth, Portland, OR (US); Isabella Wong, Bellevue, WA (US); Anh Huynh, Tigard, OR (US); Hemingway Huynh, Salem, OR (US)

(73) Assignee: PROLIFIQ SOFTWARE INC., Beaverton, OR (US)

( * ) Notice: Subject to any disclaimer, the term of this patent is extended or adjusted under 35 U.S.C. 154(b) by 387 days.

(21) Appl. No.: 13/841,982

(22) Filed: Mar. 15, 2013

(65) Prior Publication Data

US 2014/0208391 A1   Jul. 24, 2014

Related U.S. Application Data

(60) Provisional application No. 61/755,428, filed on Jan. 22, 2013.

(51) Int. Cl.
*G06F 7/04* (2006.01)
*G06F 15/16* (2006.01)
(Continued)

(52) U.S. Cl.
CPC .......... *H04L 63/10* (2013.01); *H04L 12/1859* (2013.01); *H04L 51/063* (2013.01);
(Continued)

(58) Field of Classification Search
CPC ... H04L 63/10; H04L 63/104; H04L 63/0428; H04L 12/1859; H04L 51/14; H04L 51/28
(Continued)

(56) References Cited

U.S. PATENT DOCUMENTS

| 5,907,598 | A | * | 5/1999 | Mandalia et al. ....... 379/100.01 |
| 5,983,022 | A | | 11/1999 | Watkins |

(Continued)

FOREIGN PATENT DOCUMENTS

| WO | WO0030009 A2 | 5/2000 |
| WO | WO0065762 A2 | 11/2000 |
| WO | WO01/93509 A1 | 12/2001 |

OTHER PUBLICATIONS

Backweb Technologies, Inc.; "BackWeb and ElasticEdge Enable Easy Delivery of Rich Media Content with BackWeb's Push Technology," San Jose, California, http://216.239.51.100/sea... relelasticedge.html+email+html+push+any+type+of+media+ &hl=3, 2 pg., Jun. 29, 2000.
(Continued)

*Primary Examiner* — Dede Zecher
*Assistant Examiner* — Abdullah Almamun
(74) *Attorney, Agent, or Firm* — Schwabe, Williamson & Wyatt, P.C.

(57) ABSTRACT

Embodiments of methods, systems and storage media associated with publication of message content may be described. In embodiments, a content creator may provide content to a message management node. Based on application of one or more business rules, one or more authorized recipients of the message content may be identified, and the message content may be provided to the one or more recipients. In various embodiments, the message content may be reviewed by one or more approvers prior to publication. The message content may not be provided to the authorized recipients without approval from the approvers. Other embodiments may be described and claimed.

20 Claims, 9 Drawing Sheets

(51) Int. Cl.
*H04L 29/06* (2006.01)
*H04L 12/58* (2006.01)
*H04L 12/18* (2006.01)

(52) U.S. Cl.
CPC .............. *H04L 51/14* (2013.01); *H04L 51/28* (2013.01); *H04L 63/0428* (2013.01); *H04L 63/104* (2013.01)

(58) Field of Classification Search
USPC ............................................................ 726/4
See application file for complete search history.

(56) References Cited

U.S. PATENT DOCUMENTS

| | | | |
|---|---|---|---|
| 5,987,504 A | 11/1999 | Toga | |
| 6,014,689 A | 1/2000 | Budge | |
| 6,023,714 A | 2/2000 | Hill | |
| 6,035,339 A | 3/2000 | Agraharam | |
| 6,092,114 A | 7/2000 | Shaffer | |
| 6,119,165 A | 9/2000 | Li | |
| 6,167,435 A | 12/2000 | Druckenmiller et al. | |
| 6,167,441 A | 12/2000 | Himmel | |
| 6,182,094 B1 | 1/2001 | Humpleman | |
| 6,212,564 B1 | 4/2001 | Harter | |
| 6,243,392 B1 | 6/2001 | Uemura | |
| 6,247,050 B1 | 6/2001 | Tso | |
| 6,253,207 B1 | 6/2001 | Malek | |
| 6,279,030 B1 | 8/2001 | Britton | |
| 6,279,041 B1 | 8/2001 | Baber | |
| 6,292,554 B1 | 9/2001 | Oden | |
| 6,317,761 B1 | 11/2001 | Landsman | |
| 6,317,782 B1 | 11/2001 | Himmel | |
| 6,317,795 B1 | 11/2001 | Malkin | |
| 6,345,279 B1 | 2/2002 | Li | |
| 6,345,298 B1 | 2/2002 | Moriya | |
| 6,356,921 B1 | 3/2002 | Kumar | |
| 6,360,252 B1 | 3/2002 | Rudy | |
| 6,363,524 B1 | 3/2002 | Loy | |
| 6,393,605 B1 | 5/2002 | Loomans | |
| 6,470,378 B1 | 10/2002 | Tracton | |
| 6,480,537 B1 | 11/2002 | Agrawal | |
| 6,496,980 B1 | 12/2002 | Tillman | |
| 6,563,912 B1 | 5/2003 | Dorfman | |
| 6,594,699 B1 | 7/2003 | Sahai | |
| 6,625,460 B1 | 9/2003 | Patil | |
| 6,643,684 B1 | 11/2003 | Malkin | |
| 6,704,024 B2 | 3/2004 | Robotham | |
| 6,704,396 B2 | 3/2004 | Parolkar | |
| 6,738,803 B1 | 5/2004 | Dodrill | |
| 6,742,043 B1 | 5/2004 | Moussa | |
| 6,760,916 B2 | 7/2004 | Holtz | |
| 6,763,377 B1 | 7/2004 | Belknap | |
| 6,789,108 B1 | 9/2004 | McMillan | |
| 6,792,575 B1 | 9/2004 | Samaniego | |
| 6,795,863 B1 | 9/2004 | Doty | |
| 6,829,633 B2 | 12/2004 | Gelfer | |
| 6,832,241 B2 | 12/2004 | Tracton | |
| 6,904,450 B1 | 6/2005 | King | |
| 6,906,818 B1 | 6/2005 | Makishima | |
| 6,938,077 B2 | 8/2005 | Sanders | |
| 6,961,754 B2 | 11/2005 | Christopoulos | |
| 6,970,602 B1 | 11/2005 | Smith | |
| 6,976,082 B1 | 12/2005 | Ostermann | |
| 6,978,418 B1 | 12/2005 | Bain | |
| 6,992,983 B1 | 1/2006 | Chatterjee | |
| 6,996,618 B2 | 2/2006 | Apostolopoulos | |
| 7,003,794 B2 | 2/2006 | Arye | |
| 7,024,485 B2 | 4/2006 | Dunning | |
| 7,051,084 B1 | 5/2006 | Hayton | |
| 7,061,928 B2 | 6/2006 | Giroti | |
| 7,065,555 B2 | 6/2006 | Foulger et al. | |
| 7,149,964 B1 | 12/2006 | Cottrille et al. | |
| 7,228,343 B2 | 6/2007 | Sanders | |
| 7,251,678 B2 | 7/2007 | Mori | |
| 7,523,167 B2 | 4/2009 | Thomas et al. | |
| 7,567,671 B2 | 7/2009 | Gupte | |
| 7,567,916 B1 | 7/2009 | Koeppel | |
| 7,584,251 B2 | 9/2009 | Brown et al. | |
| 7,707,317 B2 | 4/2010 | Huynh | |
| 7,755,786 B2 | 7/2010 | Foehr | |
| 7,770,200 B2 | 8/2010 | Brooks | |
| 7,802,286 B2 | 9/2010 | Brooks | |
| 7,941,525 B1 | 5/2011 | Yavilevich | |
| 7,966,374 B2 | 6/2011 | Huynh | |
| 8,478,824 B2 * | 7/2013 | Peled et al. | 709/206 |
| 2001/0016869 A1 | 8/2001 | Baumeister | |
| 2001/0034769 A1 | 10/2001 | Rast | |
| 2001/0043516 A1 | 11/2001 | Gelfer | |
| 2001/0047517 A1 | 11/2001 | Christopoulos | |
| 2002/0016818 A1 | 2/2002 | Kirani | |
| 2002/0032754 A1 | 3/2002 | Logston | |
| 2002/0065925 A1 | 5/2002 | Kenyon | |
| 2002/0073217 A1 | 6/2002 | Ma | |
| 2003/0028647 A1 | 2/2003 | Grosu | |
| 2003/0055925 A1 | 3/2003 | McAlinden | |
| 2003/0093565 A1 | 5/2003 | Berger | |
| 2003/0097485 A1 | 5/2003 | Horvitz | |
| 2003/0110234 A1 | 6/2003 | Egli | |
| 2003/0110236 A1 | 6/2003 | Yang | |
| 2003/0154253 A1 | 8/2003 | Smith | |
| 2003/0161448 A1 | 8/2003 | Parolkar | |
| 2003/0200263 A1 | 10/2003 | Goldberg | |
| 2003/0236892 A1 | 12/2003 | Coulombe | |
| 2003/0236917 A1 | 12/2003 | Gibbs | |
| 2004/0019648 A1 * | 1/2004 | Huynh et al. | 709/206 |
| 2004/0083291 A1 | 4/2004 | Pessi | |
| 2004/0093429 A1 | 5/2004 | Henry Burton et al. | |
| 2004/0133640 A1 | 7/2004 | Yeager | |
| 2004/0225753 A1 | 11/2004 | Marriott | |
| 2005/0005022 A1 | 1/2005 | Taylor | |
| 2005/0060381 A1 * | 3/2005 | Huynh et al. | 709/206 |
| 2005/0076089 A1 | 4/2005 | Fonseca | |
| 2005/0165913 A1 | 7/2005 | Coulombe | |
| 2005/0182728 A1 * | 8/2005 | Matsukawa | H04L 9/00 705/53 |
| 2005/0262206 A1 | 11/2005 | Weir | |
| 2006/0020666 A1 | 1/2006 | Lai | |
| 2006/0036554 A1 * | 2/2006 | Schrock | G06F 21/10 705/75 |
| 2006/0168064 A1 * | 7/2006 | Huynh et al. | 709/206 |
| 2006/0271494 A1 * | 11/2006 | Ito | G06F 21/10 705/59 |
| 2006/0272026 A1 * | 11/2006 | Niwano | G06F 21/10 726/27 |
| 2007/0083810 A1 | 4/2007 | Scott | |
| 2007/0283048 A1 | 12/2007 | Theimer | |
| 2008/0046562 A1 | 2/2008 | Butler | |
| 2008/0098420 A1 | 4/2008 | Khivesara | |
| 2008/0114830 A1 | 5/2008 | Welingkar | |
| 2008/0209001 A1 | 8/2008 | Boyle et al. | |
| 2009/0259821 A1 * | 10/2009 | Yasrebi | H04L 51/14 711/172 |
| 2010/0169424 A1 * | 7/2010 | Gustafsson | H04L 51/14 709/206 |
| 2010/0235457 A1 | 9/2010 | Huynh | |
| 2011/0202981 A1 * | 8/2011 | Tamai et al. | 726/6 |
| 2011/0206200 A1 * | 8/2011 | Sovio | H04L 9/3073 380/30 |
| 2013/0006780 A1 * | 1/2013 | Raleigh | G06Q 10/06375 705/14.73 |
| 2013/0321855 A1 * | 12/2013 | Bhatia | H04L 63/10 358/1.15 |

OTHER PUBLICATIONS

Backweb Technologies, Inc.; "BackWeb Launches Universal Push Initiative," San Jose, California, 4 pg., http://216.239.51.100/searc.../reluniypush.html+email+html+push+any+type+of+media+&hl=3, Jul. 24, 2000.

Bluestreak; "Rich Media," http://www.bluestreak.com, 6 pg. [accessed Jun. 13, 2002].

(56) References Cited

OTHER PUBLICATIONS

Boldfish, Inc.; "An Overview of Rich Media," Santa Clara, California, 4 pg., 2001.
Cisco Systems, Inc.; "The Cisco Content Delivery Network Solution for the Enterprise," San Jose, California, 18 pg., 2000.
Inktomi Corporation; "Inktomi, Portal, Redback and Sun to Launch First Integrated Solution for Broadband Services Delivery," Foster City, California, Sep. 19, 2000.
Multiforce; Cforce, Salesforce.com, internet publication, http://www.salesforce.com (accessed Dec. 3, 2005).
Push Publishing Technologies; "Push Publishing Technologies of Yesterday and Today," http://216.239.51.100/search?q=cac.../t4a.html+email+html+push+any+type+of+media+&hl=3, 6 pg., [accessed Jun. 14, 2002].
stardust.com; "CDN 2001 White Paper—The Ins and Outs of Content Delivery Networks," Stardust.com, Inc., Los Gatos, California, 19 pg., Dec. 20, 2000.
123Greetings; Greeting Cards by 123Greetings. Greeting cards, postcards, love; internet website, https://web.archive.org/web/1990125072208/http://123greetings.com/; Jan. 25, 1999.
American Greetings; internet website; http://web.archive.org/web/20000229083048l/http://www.americangreetings.com/customer/og.pd; Feb. 29, 2000.
Blue Mountain Arts; internet website; http://www.2bluemountain.com/home; Sep. 11, 1999.
Britemoon; internet article; http://www.britemoon.com/products/index3.html; Nov. 16, 2001.
Castle Mountains; internet website; http://www.castlemountains.net; Nov. 18, 2000.
Coldspark; internet website; http://www.coldspark.com/clients/marketing_exec.asp; Dec. 1, 2001.
Digital Impact; internet website; http://www.digitalimpact.com/marketers_2_2.html; Nov. 28, 1999.
Dynamics Direct; How We Boost Response; internet website; http://www3.dynamicsdirect.com/print/boost.html; Mar. 7, 2001.
eGREETINGS; internet website; https://wegb.archive.org/web/19970113184017/http://egreetings.com/; Jan. 13, 1997.
European Search Report in European Patent Application No. 14150955.4 dated Apr. 16, 2014.
eVITE.Com; internet website; http://www.evite.com/compose?linkTagger=textButton; Jun. 21, 2000.
Exact Target; internet website and user guide; https://web.archive.org/web/20041105053114/http:/website.exacttarget.com/product_agency.asp; Oct. 8, 2000.
Interact; internet website; http:/wayback.archive.org/web/200000302163346/http://www.responsys.com/website/documents/interactdata.pdf.
Jumpstart.Responsys; internet website; http://jumpstart.responsys.com/info/6-19-2000.
Kana Connect; "Who is Changing the Way E-businesses Communicate with their Customers?" Jul. 22, 2001.
Mightymail; "Email 2.0;" internet website; http://www.mightymail.colm/demo.html; Dec. 7, 2000.
Post Communications; "Technology;" internet website; http://emailmarketing.com/solutions/technology/index.html; Dec. 15, 2000.
Seibel eBUSINESS; "Siebel Email Marketing Stand-Alone Administration Guide;" Version 7.5.3, Revision A, Mar. 2004.
Seibel eBUSINESS; "Siebel Email Marketing Stand-Alone Installation Guide;" Version 7.5.3, Revision A, Mar. 2004.
TimeDance; TimeDance Acquires Invitemetoo; Leading Online Invitation Sites Join Forces; Business Wire; internet article; www.thefreelibrary.com/_/print/PrintArticle.aspx?id-59610369; Feb. 22, 2000.
Unity Mail; "Unity Mail 4.0—technically speaking;" internet website; http://www.messagemedia.com/solutions/unitymail/um4_0_specs.shtml; Apr. 13, 2001.
Unity Mail; "Why Unity Mail?;" internet website http://www.messagemedia.com/solutions/unitymail/um4_0_whyUM.shtml; Apr. 13, 2001.
Yesmail; "YesConnect Retention—Manage Simple to Sophisticated Email Programs with Yesmail's Flexible Technology;" internet website.
Canadian Patent Application No. 2840497; Office Action; Apr. 23, 2015.
Interact; Internet website; http:/wayback.archive.org/web/200000302163346/http://www.responsys.com/website/documents/interactdata.pdf; Mar. 3, 2000.
U.S. Appl. No. 13/032,461; Non-Final Office Action; Mar. 7, 2013.
U.S. Appl. No. 13/032,461; Final Office Action; Oct. 4, 2013.
Yesmail; "YesConnect Retention—Manage Simple to Sophisticated Email Programs with Yesmail's Flexible Technology;" https://web.archive.org/web/20030309233241/http://www.postcommunications.com/images/pdf/retention.pdf; Mar. 9, 2003.
Canadian Patent Application No. 2840497; Office Action dated Apr. 1, 2016.
European Search Report in European Patent Application No. 14150955.4 dated Apr. 18, 2016.
Chinese Patent Application No. 201410030684.X; Office Action; Aug. 18, 2016.

\* cited by examiner

SYSTEM FOR MULTI-POINT PUBLICATION SYNDICATION

RELATED APPLICATIONS

This application claims the benefit of U.S. Provisional Patent Application No. 61/755,428, filed Jan. 22, 2013, which is hereby incorporated by reference in its entirety. This patent application also hereby incorporates the following applications by reference in their entirety: U.S. patent application Ser. No. 11/296,587, filed Dec. 6, 2005; U.S. patent application Ser. No. 10/976,057, filed Oct. 27, 2004; U.S. patent application Ser. No. 10/611,698, filed Jun. 30, 2003; U.S. Provisional Pat. App. No. 60/633,832, filed Dec. 6, 2004; and U.S. Provisional Pat. App. No. 60/393,176 filed on Jul. 1, 2002.

FIELD

This present invention is directed to the field of electronic messaging, and in particular to management and distribution of electronic messages.

BACKGROUND

Electronic communications provide a powerful means of communicating content to a targeted audience. Traditional efforts utilizing electronic communications involve a user assembling content and distributing content to selected recipients. While this may provide an effective strategy in many circumstances, it requires significant computational resources to provide access and control of the content to be incorporated into the message, as well as human resources to direct the creation of the message.

BRIEF DESCRIPTION OF THE DRAWINGS

Embodiments are illustrated by way of example and not by way of limitation in the figures of the accompanying drawings, in which the like references indicate similar elements and in which.

DETAILED DESCRIPTION

In the description to follow, various aspects of the present invention will be described, and specific configurations will be set forth. However, embodiments of the present invention may be practiced with only some or all aspects, and/or without some of these specific details. In other instances, well-known features may be omitted or simplified in order not to obscure the description.

The description will be presented in terms of operations performed by a processor based device, using terms such as receiving, transmitting, determining, identifying, displaying and the like, consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding embodiment of the present invention; however, the order of description should not be construed as to imply that these operations are necessarily order dependent. In particular, these operations need not be performed in the order of presentation.

The description repeatedly uses the phrase "in one embodiment", which does not necessarily refer to the same embodiment, although it may. Furthermore, the terms "comprising", "including", "having", and the like, as used in the present application, are synonymous.

The phrase "A and/or B" means "(A), (B), or (A and B)." The phrase "at least one of A, B, and C" means "(A), (B), (C), (A and B), (A and C), (B and C), or (A, B, and C)."

In accordance with embodiments of the present invention, message management services may be provided for generating and transmitting electronic messages having digital content items to one or more designated recipients at the receipt of a message construct. Additionally, embodiments of the present invention may provide for the adaptation of the form and/or content of the electronic message based on capabilities and/or preferences associated with the message recipient.

Figure 1:
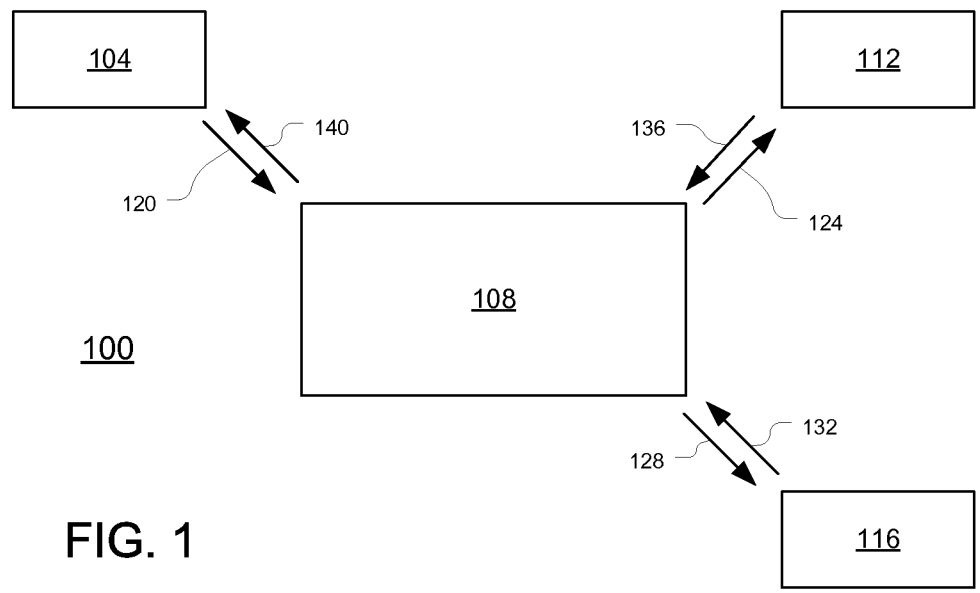
FIG. 1 illustrates a network within which a message management service may be employed in accordance with various embodiments.

FIG. 1 illustrates a network 100 within which a message management service (MMS) may be employed in accordance with an embodiment of the present invention may be practiced. In this embodiment, a sending device 104 may be communicatively coupled to a message manager 108, which may, in turn, be communicatively coupled to a receiving device 112 and a third-party device 116, as shown. In various embodiments, these elements may be coupled to one another through one or more communication networks, including both wired and wireless communication links, ranging from local networks to one or more global interconnected networks such as the publicly-switched telephone network (PSTN), Internet or World Wide Web.

The sending device 104 may transmit an electronic message, e.g., message construct 120, to the message manager 108, including construct information for construction and/or delivery of an electronic message to a recipient. The construct information may include recipient information, e.g., information about a recipient associated with the receiving device 112 and/or requested content information, e.g., information that is directly and/or indirectly related to content that the recipient is, or may be, interested in. As used herein, content that the recipient is, or may be, interested in may be also be referred to as "requested content." It may be noted that requested content need not be explicitly requested by the recipient in all embodiments. Requested content information directly related to the requested content could include, e.g., a request for information on a particular product and/or service (hereinafter collectively referred to as "core content"). Requested content information indirectly related to requested content could include, e.g., information on recipient's occupation, interests, hobbies, work address, home address, timeframe for making a purchase of products/services, etc. (hereinafter collectively referred to a "peripheral content"). In one embodiment, the message manager 108 may derive the requested content, in whole or in part, from this peripheral content.

Briefly, the message manager 108 may receive the message construct 120 from the sending device 104, including identification of the recipient and requested content information, and generate an electronic message 124 according to a message generation specification. The message generation specification may direct the generation of the electronic message 124 through providing associations between requested content information, received from the sending device 104, and message templates and content controlled and accessible by the message manager 108, to be described in further detail below. As used herein the electronic message 124 may also be referred to as derived message 124 as its formation is at least partly derived from the message construct 120.

In various embodiments, the content may include any number of digital content elements such as, but not limited to, text, data, image, audio, video, web, executable elements and the like. Digital content elements may also refer to links or other user interface controls designed to enable recipients to obtain further information about a message, to forward the message to another recipient, to request to not receive similar messages in the future, and so forth.

As used herein electronic messages, including the derived message 124, may be of a variety of message types including but not limited to a text message, a multimedia message, an electronic mail (e-mail), a file (either coupled to one of the earlier described message types or transferred independently), e.g., a extensible markup language (XML) file, and the like delivered over appropriate channel delivery services including but not limited to simple messaging service (SMS), multimedia messaging service (MMS), the Internet and the like. Electronic messages may be delivered according to a variety of message transfer protocols including but not limited to transmission control protocol/Internet protocol (TCP/IP), simple mail transfer protocol (SMTP), hypertext transfer protocol (HTTP), Global System for Mobile Communications (GSM), file transfer protocol (FTP), and protocols directed toward communication of markup language files ((e.g., XML) such as, simple object access protocol (SOAP), XML-remote procedure call (RPC), Global XML Web Services Architecture (GXA), Representational State Transfer (REST), and the like. As used herein, the particular message type and corresponding services, protocols, structures, etc. to communicate that particular message type from one device to another over the network may be referred to as a delivery channel.

The device 104, message manager 108, device 112, and/or device 116 may include user-devices and/or server devices such as a host server equipped with the device, or communicatively coupled thereto, to facilitate creation and/or transmission of the various electronic messages. For example, in an embodiment a host server may be a mail server designed to deliver and/or receive e-mail. Such a mail server may be a hardware based device or a software service that executes on the sending device 104, message manager 108, receiving device 112, and/or third-party device 116.

Sending device 104, message manager 108, receiving device 112, and third-party device 116 may each represent a broad range of digital systems known in the art, including but not limited to devices such as wireless mobile phones, palm sized personal digital assistants, notebook computers, desktop computers, servers, set-top boxes, game consoles and the like.

Following creation of the derived message 124, the message manager 108 may then forward it to the receiving device 112 via a selected delivery channel. In various embodiments, the message manager 108 may also generate and transmit a notification message 128 to a third-party device 116 to, e.g., notify an interested party of selected details of the transaction including, but not limited to, information on the sender, the receiver, the requested content information, and/or the one or more digital content elements provided in the derived message. This third-party notification may, for example, provide a local sales representative with information that a prospective customer has inquired about one or more products and/or services.

In one embodiment, a message manager 108 may delay the transmission of the derived message 124 pending indication from a third-party user that the derived message 124 should be sent. Such an indication could be a reply or specified interaction with the notification message 128. This may provide notice to the third-party user prior to actual transmission of the derived message 124. This pre-notification, coupled with the inclusion of content related to the third-party user, e.g., a digital business card, may provide the perception, to the recipient, that the third-party user has generated the derived message, with little actual effort expended on behalf of the third-party user.

In an embodiment, various acknowledgement messages, e.g., messages 132, 136, and 140, may be transmitted to communicate various activities such as, but not limited to, receipt and/or read activities.

Embodiments of the present invention may provide teachings to leverage a relatively simple message construct 120 into a potentially more sophisticated derived message 124 delivering content in a manner that may be tailored to aspects of the receiving environment. Transmission of the message construct 120 may be accomplished without the need for significant processing power, bandwidth, memory, and/or authoring involvement at the sending device 104 that would otherwise be necessary for control of all aspects of the message construction. Thus, embodiments of the present invention present the option of employing thin-client devices for the sending device 104; however, embodiments are not so limited.

Figure 2:
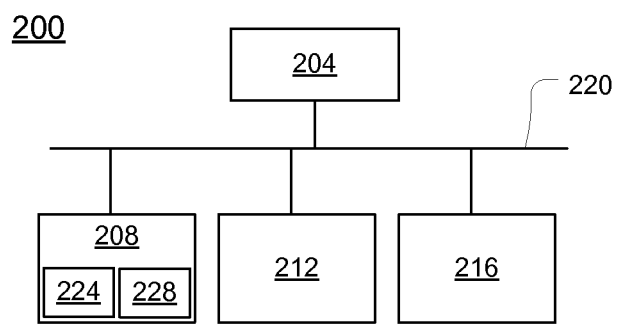
FIG. 2 illustrates a computer system generally suitable for use as a sending device in accordance with various embodiments.

FIG. 2 illustrates a computer system 200 generally suitable for use as sending device 104 in accordance with an embodiment of the present invention. In this embodiment, the system 200 may include a processor 204, memory 208, input/output device(s) 212, and a networking interface 216, coupled to each other via a communication bus 220. During operation, memory 208 may store working copies of an operating system (OS) 224 and message construct component (MCC) 228, which may include an implementation of an application programming interface (API), in a volatile storage element; while a non-volatile storage element may be used for persistent storage of the OS 224 and MCC 228. The implementation of the API may be based on an XML-processing model such as, but not limited to, a document object model (DOM), a simple API for XML (SAX), an ECMAScript for XML E4X, etc.

In various embodiments, the memory 208 may include a variety of storage mediums such as, but not limited to, volatile memory, e.g., random access memory (RAM), dynamic RAM (DRAM), static RAM (SRAM), and the like; non-volatile memory, e.g., read-only memory (ROM), electrically erasable-programmable ROM (EEPROM), Flash, and the like; and removable memory, e.g., compact disk (CD); digital versatile disk (DVD), Flash, and the like.

In an embodiment a persistent copy of the MCC 228 may be downloaded from a distribution server through a data network, installed in the factory, or in the field. For field installation, the persistent copy may be distributed using one or more articles of manufacture such as diskettes, CDROM, DVD, Flash and the like, having a recordable medium including but not limited to magnetic, optical, and other mediums of the like.

In various embodiments the processor 204 may include one or more of a microprocessor (having one or more processing cores), a controller, an application specific integrated circuit, and the like. The processor 204 may perform the function of executing programming instructions of OS 224 and MCC 228 to enable the operations of the various elements as described herein.

In various embodiments the input/output device(s) 212 may include a display device including but not limited to a CRT and an active or passive matrix LCD display, to output a user interface, the creation of which may be controlled by instructions of the MCC 228. The input/output device(s) 212 may also include input mechanisms including but not limited to: a mouse; a touch pad; a track ball; a keyboard; a bar-code scanner; a Bluetooth transceiver; an infrared transceiver; radio-frequency identification transceiver, and the like to facilitate user input into the system 200.

Lastly, in various embodiments the networking interface 216 may represent a wireless network interface, an integrated services digital network (ISDN) adapter, a digital subscriber line (DSL) interface, an Ethernet or Token ring network interface, and the like.

Figure 3:
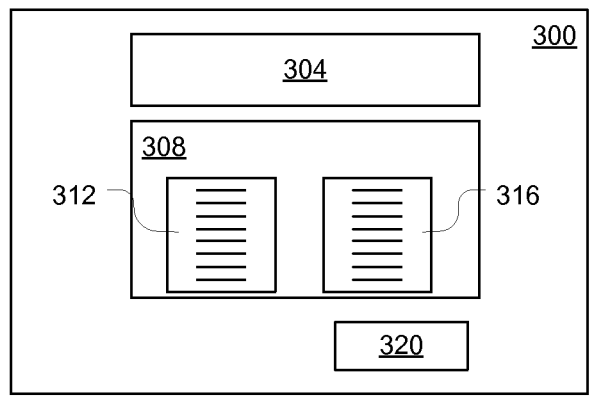
FIG. 3 illustrates an example of a user interface in accordance with various embodiments.

FIG. 3 illustrates an example of a user interface 300 suitable for output on display of sending device 104 in accordance with an embodiment of the present invention. The user interface 300 may include a recipient information field 304 and a requested content information field 308, values for which may be input by an operator using one or more input devices such as those described above. The recipient information field 308 may receive an electronic address, e.g., an e-mail address, a phone number, etc., of the recipient. In another embodiment, the recipient information field 308 may include a unique identifier of the recipient, which may be linked with an electronic address of the recipient at the message manager 108.

The requested content information field 308 may provide a user with a selection of core-content candidates 312. The core-content candidates 312 may be selected from a list of, for example, products and/or services, for which the message manager 108 may have access to the associated content. The core-content candidates 312 may be presented to the user in a variety of ways such as, but not limited to, a check-the-box selection or through a pull-down menu.

In an embodiment, the requested content information field 308 may additionally/alternatively provide for peripheral content queries 316 directed to solicit information on peripheral content that may be of relevance. In some embodiments, the peripheral content queries 316 may be dependent upon which of the core-content candidates 312 is selected.

In some embodiments, the MCC 228 may query the message manager 108 for population of the requested content information field 308, including, for example, the current core-content candidates 312. The requested content information field 308 may be customized based at least in part on user credentials, device configuration, and/or device operational capabilities. For example, in accordance with an embodiment of the present invention, the message manager 108 may populate the requested content information field 308 based upon an identification of the operational capabilities of the sending device 104. For example, traditional wireless devices, such as mobile phones and personal digital assistants, may be equipped with less powerful hardware (including displays, processors, and memory) and software components than their wireline counterparts. Therefore, if the sending device 104 is identified as such a device it may be advantageous to adapt the requested content information field 308 to account for such potential limitations. This may be done, for example, by providing a reduced set of peripheral content queries 316. On the other hand, in an embodiment where the sending device 104 has significant resources, e.g., is a desktop computing device, the set of peripheral content queries 316 may be more comprehensive. The identification of the operational capabilities of the sending device 104 may be done through, e.g., association with user credentials, transmission of capability information from the sending device 104 to the message manager 108 at a handshake operation, resulting from a query, an unprompted transmission, etc.

Once, the appropriate information has been added to the appropriate fields, the user may transmit the message construct 120 to the message manager 108 using a send function 320. The activation of the send function 320 may cause the MCC 228 to create a file including the values given for the various fields, which may be transmitted as the message construct 120. In some embodiments, the file created by the MCC 228 may be, but is not limited to, a general purpose markup language, e.g., ASN.1 (Abstract Syntax Notation One), EBML, XML, YAML, etc.

While the illustrated embodiment shows the core-content candidates 312 and the peripheral content queries 316 depicted side-by-side on the same screen, other embodiments, may provide a series of screenshots including the various fields.

Figure 4:
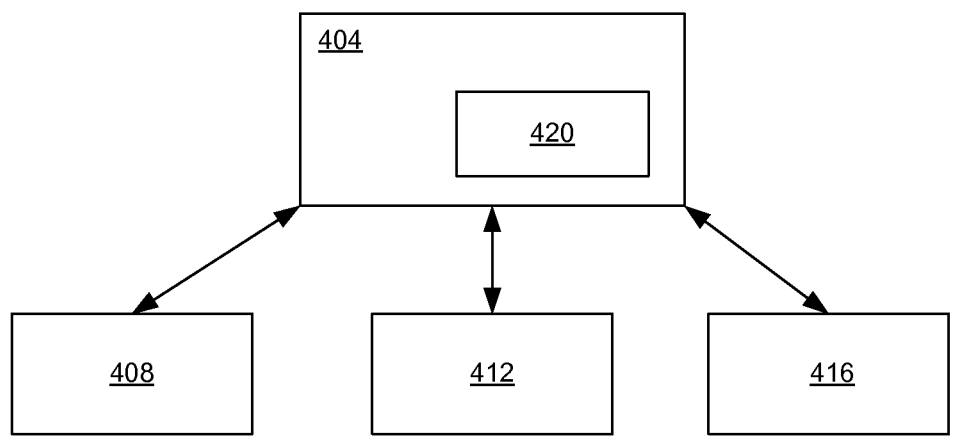
FIG. 4 illustrates a message manage in accordance with various embodiments.

FIG. 4 illustrates the message manager 108 in accordance with an embodiment of the present invention. The message manager 108 may include a message management node 404 communicatively coupled to an administration console 408, integration resources 412, and a message tracker 416. The message management node 404 may include a message creation specification 420 for directing creation of the derived message 124.

The administration console 408 may provide authoring services for an authorized administrator. The authoring services may include services to facilitate creation and/or editing of the message creation specification 420, locally stored content, rules, and other administrative tasks. Additionally, the authoring services may provide a message-template editing environment through which an administrator may compose/edit message templates including, for example, format definitions and/or content definitions for one or more of the cells within the template. In one embodiment, the authoring services may provide graphical or text-based tools.

In some embodiments, if the appropriate digital content to be associated with the requested content information may not be locally accessible, the message management node 404 may cooperate with integration resources 412 in order to acquire such content. In various embodiments, the integration resources 412 may include, for example, external content management systems, database management systems, etc.

The message tracker 416 may include a database to track various activities and/or events. These activities and/or events could include information on the sender, the recipient, the message construct 120, the derived message 124, acknowledgement message 136, which may include information on recipient interaction with derived message 124, for example, which digital content elements are activated by recipient, etc. In some embodiments, a message record of these activities and/or events may be transmitted notification message 128.

Figure 5:
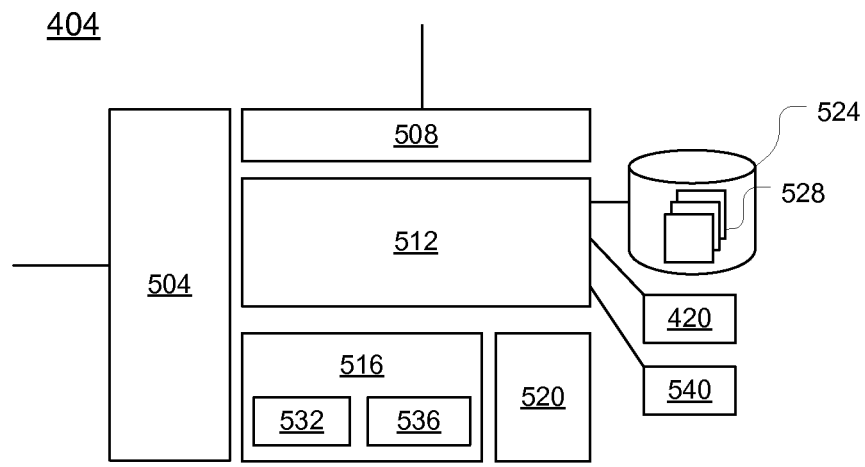
FIG. 5 illustrates a message management node in accordance with various embodiments.

FIG. 5 illustrates the message management node 404 in more detail in accordance with an embodiment of the present embodiment. The message management node 404 may include an interface component 504, a delivery component 508, a message creation component 512, a content component 516, and a rules component 520.

As used herein, the term 'component' is intended to refer to programming logic that may be employed to obtain a desired outcome. The term component may be synonymous with 'module' and may refer to programming logic that may be embodied in hardware or firmware, or in a collection of software instructions, possibly having entry and exit points, written in a programming language, such as, for example, C++. In various embodiments, components may be co-located in the same device, e.g., a server, may be located in a device dedicated to the particular component's function, or may distributed over a collection of devices cooperatively interacting to obtain the outcome described.

A software component may be compiled and linked into an executable program, or installed in a dynamic link library, or may be written in an interpretive language such as BASIC. It will be appreciated that software components may be callable from other components/modules or from themselves, and/or may be invoked in response to detected events or interrupts. Software instructions may be embedded in firmware, such as an EEPROM or may be stored on a readable medium such as a magnetic or optical storage device. It will be further appreciated that hardware components may be comprised of connected logic units, such as gates and flip-flops, and/or may be comprised of programmable units, such as programmable gate arrays or processors. In one embodiment, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

Interaction of the components of the message manager 108 may now be described with additional reference to operational phases illustrated in FIG. 6 in accordance with an embodiment of the present invention. Operational phases may be referenced by numerals in parentheses. In an embodiment, an operation may begin by the interface component 504 receiving the message construct 120 (604). The interface component 504 may be any type of interface to facilitate reception/transmission of electronic messages over a network from/to networked devices, e.g., devices 104, 112, and 116. The interface component 504 may support various application interfaces for message composition and delivery triggers, as well as reporting interfaces. The interface component 504 may include an implementation of an API having a common set of definitions as the MCC 228, described above, to facilitate interpretation of the message construct 120. In various embodiments, the interface component 504 may be compatible with a variety of web services protocols including, but not limited to, those directed toward communication of markup language files.

The message creation component 512 may receive the message construct 120, or portions thereof, from the interface component 504. The message creation component 512 may identify the values of the message construct 120 (608) and may operate to generate the derived message 124 according to the message creation specification 420. To generate the derived message 124 the message creation component 512 may access a message template database 524, having a plurality of message template candidates 528 stored therein, in order to select a message template that is suitable for delivery of the digital content element deemed to satisfy the requested content information (612).

In the generation of the derived message 124, the message creation component 512 may also select the delivery channel, which may influence the selection of the message template and/or the digital content. In some embodiments, the selection of the delivery channel may be determined through rules provided by rules component 520 and/or through the message creation specification 420. Furthermore, embodiments of the present invention may allow for the dynamic determination of the delivery channel based upon network conditions (e.g., available bandwidth in alternative communication links), device capabilities, device preferences, etc. This may be further incorporated with teachings of the message adaptation operations below.

The message creation component 512 may also activate the content by accessing the content component 516 to select the one or more digital content elements (616). The content component 516 may include a document repository 532 having, e.g., text and/or binary elements, a media repository 536 having, e.g., audio and/or video elements, suitable to provide accessible storage of the various types of digital content elements. As discussed above, if the digital content associated with the requested content information value is not found in the content component 516, it may be accessed through integration resources 412.

In various embodiments, the message creation component 512 may link and/or embed the selected digital content elements with the selected message template. During formation of the derived message 124, digital content elements may be linked to the message template or may be embedded within message template through techniques such as object linking and embedding (OLE), or the use of uniform resource identifiers (URIs) or uniform resource locators (URLs) for example. Other methods of linking and/or embedding digital content elements to a message template may similarly be employed without departing from the spirit and scope of the embodiments of the present invention.

In some embodiments, the message creation component 512 may also generate the derived message 124 with reference to a message adaptation specification 540 to provide a flexible and extensible adaptation of the derived message 124 for delivery to the intended recipient.

In one embodiment, message adaptation specification 540 may include a message layer definition to define alternative presentations or layers for a given derivative electronic message, where each presentation may represent a different combination of digital content element candidates. In one embodiment, the derived message 124 may include one or more content cells that may be adapted to include a version of one or more digital content elements selected from the digital content element candidates 528 as may be appropriate for a given message presentation. As such, it may be possible to generate an electronic message that may be adapted to take advantage of particular configurations and/or preferences.

In one embodiment, message adaptation specification 540 may be device-specific or user-specific. For example, message adaptation specification 540 may indicate one or more operational capabilities of one or more devices, such as receiving device 112 associated with the intended recipient. Such operational capabilities may include multimedia presentation capabilities of a device, content rendering capabilities of a device, data throughput/bandwidth capabilities of a device, and may identify whether a device is configured as a wireless device or traditional, non-wireless or wireline device, and so forth. Additionally, message adaptation specification 540 may further represent user-specific (or company/entity-specific) preferences such as a message filtering level indicating, e.g., a preferred message delivery policy with respect to one or more recipients. In one embodiment, message adaptation specification 540 may represent a collection of user-specific or device-specific message adaptation specifications that may be selectively employed based upon identification of an intended recipient of the derived message 124.

In embodiments utilizing adaptive configuration of the derived message 124, the delivery component 508 may cooperate with the message creation component 512 to dynamically determine the capabilities and/or preferences of a recipient and/or receiving device 112 through execution of one or more client-side or server-side components or scripts. Accordingly, a recipient may receive the derived message 124 including one or more scripts or components, or links to one or more remotely located scripts or components, which when executed, may determine various capabilities of the receiving device 112 and request supplemental digital content elements accordingly. Alternatively, device capabilities may be predetermined and stored e.g., in the rules component 520, for access via a lookup table, file, or database by message adaptation specification 540. As such, electronic messages may be remotely adapted with one or more content element candidates prior to transmission of the message to a recipient. Of course, electronic message adaptation may be conditioned on other factors besides device capabilities.

In some embodiments, the derived message 124 may be dynamically adapted after transmission to the receiving device 112. For example, the derived message 124 may be transmitted with alternatively versioned content element candidates 528 programmed to respond by activating the appropriate version based on capabilities/preferences at the receiving device 112.

In some embodiments, the base electronic message may include an initial content layer, to which client-side scripts and recipient-specific customization information may be added through the adaptation process. The added client-side scripts may perform such functions as: reporting on the opening of the email message; reporting on the activation of digital content elements; testing the digital content capabilities of the receiving device 112; selecting the most appropriate layer of the derived message 124 to be exposed to the user based upon the results of the tests; and supplementing (including possibly replacing) the contents of the derived message 124 with those of the selected layer.

Figure 6:
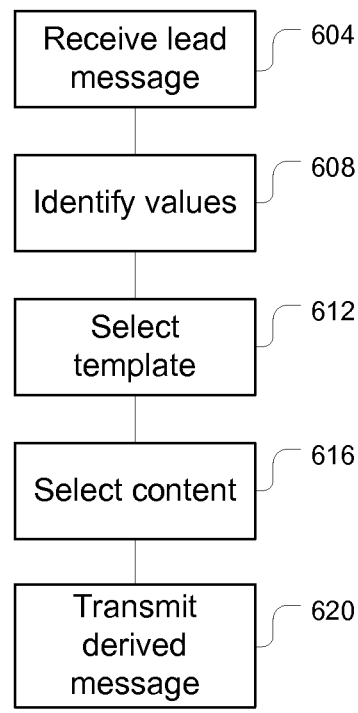
FIG. 6 illustrates an operation of a message management service in accordance with various embodiments.

While FIG. 6 illustrates the message creation specification 420 and the message adaptation specification 540 as two separate entities, in other embodiments they may be integrated.

Adaptive configuration of the derived message 124 may be based on the teachings of the above mentioned, and fully incorporated, U.S. patent application No. 60/393,176, Ser. Nos. 10/611,698, and/or 10/976,057.

Upon creation of the derived message 124, the message creation component 512 may cooperate with a delivery component 508 to transmit the derived message 124 to the receiving device 112 (620).

In some embodiments, the rules component 520 may maintain and manage business rules associated with the composition and delivery of the derived message 124 and/or the notification message 128. These rules may be created manually through, e.g., the administration console 408, or automatically based on, e.g., message delivery and performance. In various embodiments, the rules component 520 may ensure that messages comply with legal statutes and/or corporate branding policies; may facilitate the maintenance of privacy of sender data, recipient data, and/or content; may ensure appropriate deliverability, e.g., through execution of spam-filter analysis before the derived message 124 is transmitted. The rules component 520 may additionally/alternatively provide rules adapted to ensure that the derived message 124 contains proper content based on sender identification, sender locale, recipient domain, date, etc. In various embodiments, some/all of these rule-check operations may be incorporated within the message creation specification 420. Additionally, in various embodiments, the message creation specification 420 may be more directly coupled to the rules component 520, rather than to the message creation component 512.

Figure 7:
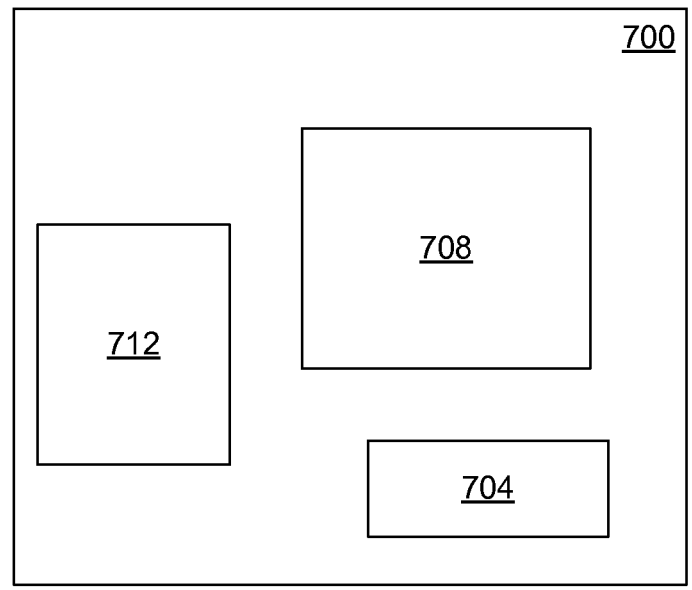
FIG. 7 illustrates a message template in accordance with various embodiments.

FIG. 7 illustrates a message template 700 in accordance with an embodiment of the present invention. The message template 700 may have cells 704, 708, and 712, each associated with a digital content element, or a type of digital content elements. In various embodiments, the cell selection and arrangement of the message template 700 may be customized based on a variety of factors including, for example, requested content, the recipient, the seller, date, channel delivery, etc. For example, the cell 704 may be associated with an image file of certain dimensions. In an embodiment, the sender's credentials may be associated with rules to provide a digital business card identifying the seller and may, therefore, utilize the cell 704 for an image of the sender's business card. However, a sender of another embodiment may have rules associated that do not provide for this particular item of personalization and therefore, cell 704 may be deactivated or used for another content element.

In some embodiments, the cells may be customized based at least in part on operational capabilities and/or preferences at the receiving device 112. For example, in an embodiment, the cell 708 may be suitable for delivery of video element while the cell 712 may be suitable for an image element. If, in an embodiment, it is determined that the receiving device 112 is not to receive video messages, the cell 708 may be deactivated and a like-topic, but differently versioned, content element may alternatively be displayed in cell 712.

In various embodiments, a variety of customization options relating to the message templates may be employed.

Figure 8:
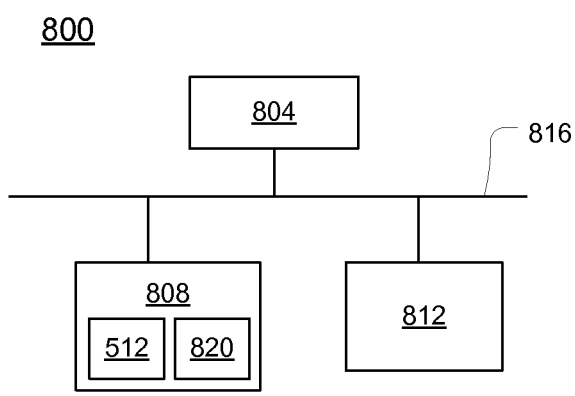
FIG. 8 illustrates a computer system generally suitable for implementing message creation component in accordance with various embodiments.

FIG. 8 illustrates a computer system 800 generally suitable for implementing message creation component 512 in accordance with an embodiment of the present invention. In this embodiment, the system 800 may include a processor 804, memory 808, and a networking interface 812, coupled to each other via a communication bus 816. During operation, memory 808 may store working copies of an OS 820 and message creation component 512 in a volatile storage element; while a non-volatile storage element may be used for persistent storage of the OS 820 and message creation component 512.

In various embodiments the processor 804 may be, for example, a microprocessor (having one or more processing cores), a controller, an application specific integrated circuit, and the like. The processor 804 may perform the function of executing programming instructions of OS 820 and the message creation component 512 to enable the operations of the various elements as described herein.

In various embodiments, the memory 808 may include a variety of storage mediums such as, but not limited to, volatile memory, e.g., RAM, DRAM, SRAM, and the like; non-volatile memory, e.g., ROM, EEPROM, Flash, and the like; and removable memory, e.g., CD; DVD, Flash, and the like.

Lastly, in various embodiments, networking interface 812 may represent a wireless network interface, an ISDN adapter, a DSL interface, an Ethernet or Token ring network interface, and the like.

Figure 9:
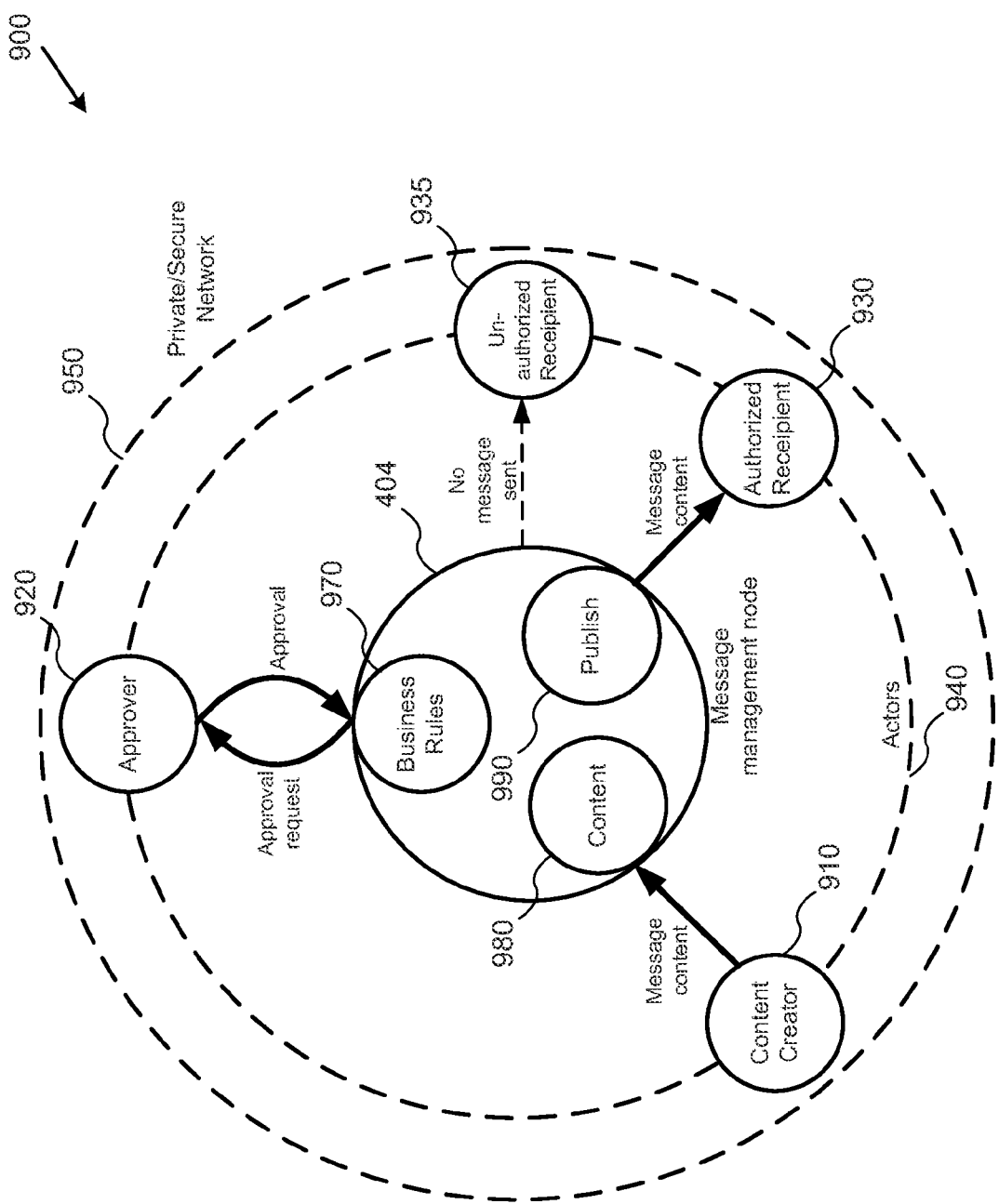
FIG. 9 illustrates example interactions between entities of a multi-point publication system in accordance with various embodiments.

In various embodiments, the message management node 404, and in particular the delivery component 508 and rules component 520 may be configured to provide for fine-grained control over delivery of one or more messages. FIG. 9 is block diagram that illustrates examples of interactions between various actors in a private secure network to provide message content to one or more recipients using various features of the message management node to provide for targeted content delivery as well as the ability to check and approve messages prior to delivery. It may be recognized that, while various activities described herein are described as being performed by the "message management node," in various embodiments, different components of the message management node and/or separate entities may perform the techniques described herein.

In various embodiments, the various interactions described herein may take place in a private and/or secure network, such as network 100 described herein. In various embodiments, network security may be provided via various means, including, but not limited to, virtual private networks, encryption of wireless network communication, encryption of messages use of wired networks, and/or authentication of one or more actors involved in message activities such as message creation, publication, provision, delivery, and/or receipt. Security may additionally be provided, in various embodiments, through permission-based provisioning of message content. In various embodiments, as illustrated, various actors, such as content creators, approvers, and recipients, may interact through the message management node to create, publish, approve, and/or receive message content. In various embodiments, the actors may interact with the message management node through various computing devices, including, but not limited to desktop and laptop computers, portable and mobile devices including tablets and mobile phones. As discussed above, the interactions between these devices and the message management node may be performed through various interfaces, such as provided by the interface component 504.

In various embodiments, client applications may provide secure interfaces to various actors, such as recipients, content creators, and approvers. In various embodiments, to communicate with a secure network, an actor operation may include presentation of an access token to the network along with the requested operation's processing instructions. In various embodiments, an application may generate an access token on behalf of an actor, such as based on the actor's provided credentials. These credentials may include a username/password, and/or other credentials signifying a trusted integration with identity management systems. In various embodiments, operations to a network may be performed over an encrypted channel (such, as for example, SSL). In various embodiments, an operation may be digitally signed with a private key associated with an access token; this digital signature may help ensure contents are not been tampered with in transport. In various embodiments, an access token may provide authentication for an actor to the network. In various embodiments, a network may enforce authorization over the requested operation based on factors such as, but not limited to, actor identity and/or the requested operation's contents (such as, but not limited to: content, recipient, business rules etc.).

In various embodiments, the message management node 404 may be configured to provide for delivery of messages based on one or more business rules. Thus, in various embodiments, the message management node 404 may be configured to determine, based on various information, one or more recipients for a message based on the business rules. In various embodiments, these business rules may be applied to information about the a content creator of the message, the message itself, and/or various recipients to determine which, if any recipients may receive a message. Particular embodiments of application of the business rules to direct delivery of messages is described herein.

FIG. 9 illustrates example interactions between various entities associated with a multi-point publication system 900 in accordance with various embodiments. In various embodiments, the multi-point publication system 900 may include various modules, such as content module(s) 980, business rules 970, and/or publish module(s) 990, which may interact with various actors 940 in a private and/or secure network 950, as described herein. In various embodiments, a content creator 910 may provide message content to one or more content modules 980 of the message management node 404, such as through the techniques described above. Examples of the provision and creation of message content may be described above. In various embodiments, the content creator may provide this message content with or without reference to particular recipients. In various embodiments, the message management node may determine particular authorized recipients 930 which are authorized to receive the message content. In various embodiments, the determination of which recipients are authorized to receive a message may be determined substantially contemporaneously with receipt of the message content. In various embodiments, business rules 970 may be configured to determine that an authorized recipient 930 is authorized based on recipient and or message content information, such as recipient preferences or legal, security, and/or privacy restrictions on the ability of the recipient to receive the particular message content. In various embodiments, the identification of authorized recipients 930 may take place in response to receipt of message content or may take place after authorization of message content, as described herein.

Thus, as illustrated in FIG. 9, the provided message content may be published by one or more publish modules 990 to an authorized recipient 930, while the message content may not be provided to an unauthorized recipient 935. In various embodiments, authorized recipients 930 may be identified by reference to credentials that may be created for various recipients, such as through application of one or more business rules. In various embodiments, the publishing of the message content to authorized recipients 930 may be performed without explicit request for the message content from the authorized recipient 930. Thus, the content creator 910 may be facilitated in "pushing" the message content to one or more authorized recipients 930, such as based on the business rules 970.

In addition to targeted publication of message content, message content may be subject to approval before publication. Thus, for example, message content may be sent to one or more approvers 920 for approval prior to publishing the message content to an authorized recipient 930. In various embodiments, the approver 920 may approve (or deny) the publication of the message content separately from application of any business rules 970 that may identify authorized recipients 930. In various embodiments, a content creator 910 may be determined to be authorized or not authorized to send particular message content, based on approval by one or more approvers 920, applications of business rules 970, or both.

Figure 10:
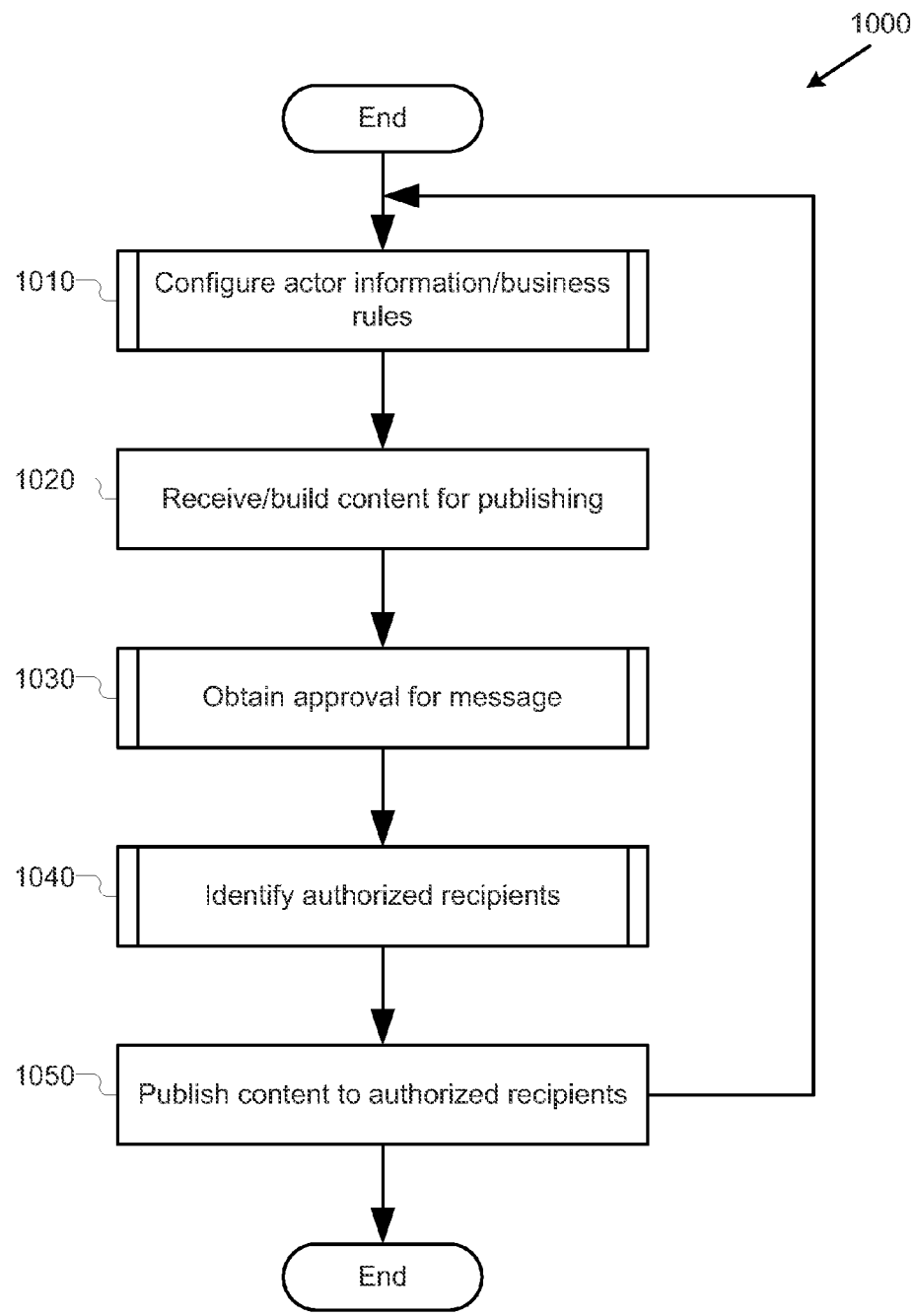
FIG. 10 illustrates an example process for publishing message content with approval and/or recipient control in accordance with various embodiments.

FIG. 10 is a flowchart that illustrates examples various embodiments of a process 1000 for publishing message content with approval and/or recipient control. While FIG. 10 illustrates a particular order of particular operations, in various embodiments, operations of FIG. 10 may be reordered, broken into additional operations, and/or omitted entirely. The process may begin at operation 1010 where the message management node 404 may configure actor information and/or business rules to use during subsequent receipt and publishing of message content. Particular examples of this operation are discussed below with reference to FIG. 11.

Next, at operation 1020, the message management node 404 may receive message content. In various embodiments, the message content may be received in complete form. In alternative embodiments, the message content may be generated, in whole or in part, using the message management node 404, such as using message creation techniques/content modules 980 described above. In some embodiments, messages that include, in whole or in part, the received message content may be generated. In some embodiments, generation of messages may be postponed, in whole or in part, such that message generation may be made with reference to one or more authorized receivers. Next, at operation 1030 the message management node 404 may obtain approval for the message. Particular examples of this operation are discussed below with reference to FIG. 12.

After approval is obtained, then at operation 1040 the message management node 404 may identify one or more authorized recipients 930 for the message content. In various embodiments, the identification of authorized recipients 930 may be performed based on an audience rule or other business rule 970. Particular examples of this operation are discussed below with reference to FIG. 13. Once the authorized recipients 930 have been identified, at operation 1050 the message management node 404 may publish the message content to the previously-identified authorized recipients 930. In various embodiments, publication of message content may include various types of publishing, including the sending of emails, text messages, images, and/or other content directly to authorized recipients. In various embodiments, the message content may be published in an adaptive configuration. In yet other embodiments publication of message content may include providing a publicly-available facility for authorized recipients to access message content, such as through a website or other electronic means. In various embodiments, when an authorized recipient 930 seeks to access message content after publication, the message management mode 404, or other entity, may confirm authorization of the recipient before providing message content; this authorization may be confirmed whether the message content is delivered directly to the authorized recipient 930 or is published at a publicly-available facility. In various embodiments, the message content may be modified, reduced, and/or augmented by the message management node 404 and/or other entity, based at least in part on the identity of a requesting recipient and/or that requesting recipient's credentials.

In various embodiments, after publication of the message content, the process may repeat, such as by returning to operation 1010. For example, new actor information may be received and/or business rules may be created or modified based on previous publication of message content. In some embodiments, however, the process may then end.

Figure 11:
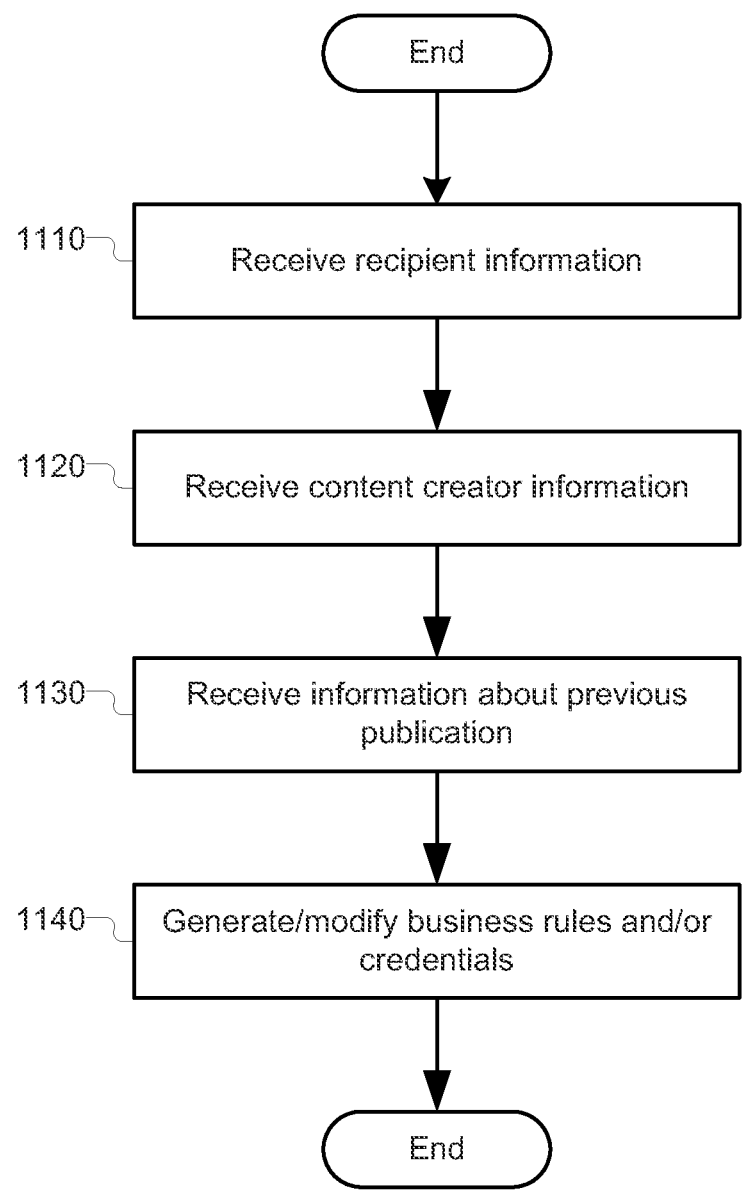
FIG. 11 illustrates an example process for configuring actor information and business rules for the multi-point publication system in accordance with various embodiments.

FIG. 11 is a flowchart that illustrates examples of various embodiments of a process for configuring actor information and business rules for the multi-point publication system. While FIG. 11 illustrates a particular order of particular operations, in various embodiments, operations of FIG. 11 may be reordered, broken into additional operations, and/or omitted entirely. The process may begin at operation 1110 where the message management node may receive recipient information for one or more message recipients to use to determine which recipients may be authorized to receive message content. In various embodiments, this information may include recipient demographic information, recipient preferences (such as message type, length, content, reading level, etc.), message receipt history, message read history, and/or other information. In some embodiments, the recipient information may include information confirming the recipient's ability to receive certain types of restricted message content. Thus, for example, the message management node may receive recipient authentication information, security information, legal information, etc.

Next, at operation 1120 the message management node may receive content creator information to be used to determine authorized recipients. In various embodiments, the content creator information may include content creator identity information, general message content type information, security information, legal information, etc. Next, at operation 1130 the message management node may then receive information about previous publication. For example, if content creators and/or recipients have provided feedback on previously-published message content, such information may be received at this operation and then used to generate or modify business rules. In another example, if publication of message content to a particular recipient has failed (either once or above a pre-set threshold) then at this information that information be received to allow business rules to be configured to make it less likely that additional message content will be published to that recipient.

Next, at operation 1140 business rules and/or credentials may be generated and/or modified to identify, for message content, which recipients may be authorized to receive the information. In various embodiments, the message management node itself may perform generation and/or modification of one or more business rules. For example, the message management node may generate and/or modify business rules based on security, legal, or privacy information previously received that requires a recipient to have proper authorization to receive restricted message content. In another example, the message management node may generate a business rule that prevents users from receive message content that is specific to a particular geographic area if they do not reside in that area. In various embodiments, the message management node may also create credentials for one or more recipients. These credentials may serve to identify message content that the recipients are authorized to view. As such, the credentials may identify types of message content, message content subject matter, content creator identity, geographical information, etc. from which it can be determined for specific message content, whether the recipient is authorized to receive the content.

In various embodiments, the message management node may provide a facility for a user of the message management node to generate and/or modify one or more business rules and/or credentials, either in lieu of or in addition to business rules and/or credentials that may be generated by the message management node. In various embodiments, the message management node may be configured to display or otherwise provide recipient and/or content creator information to a user to facilitate generation and/or modification of business rules and/or credentials. After generation and/or modification of the business rules and/or credentials, the process may then end.

Figure 12:
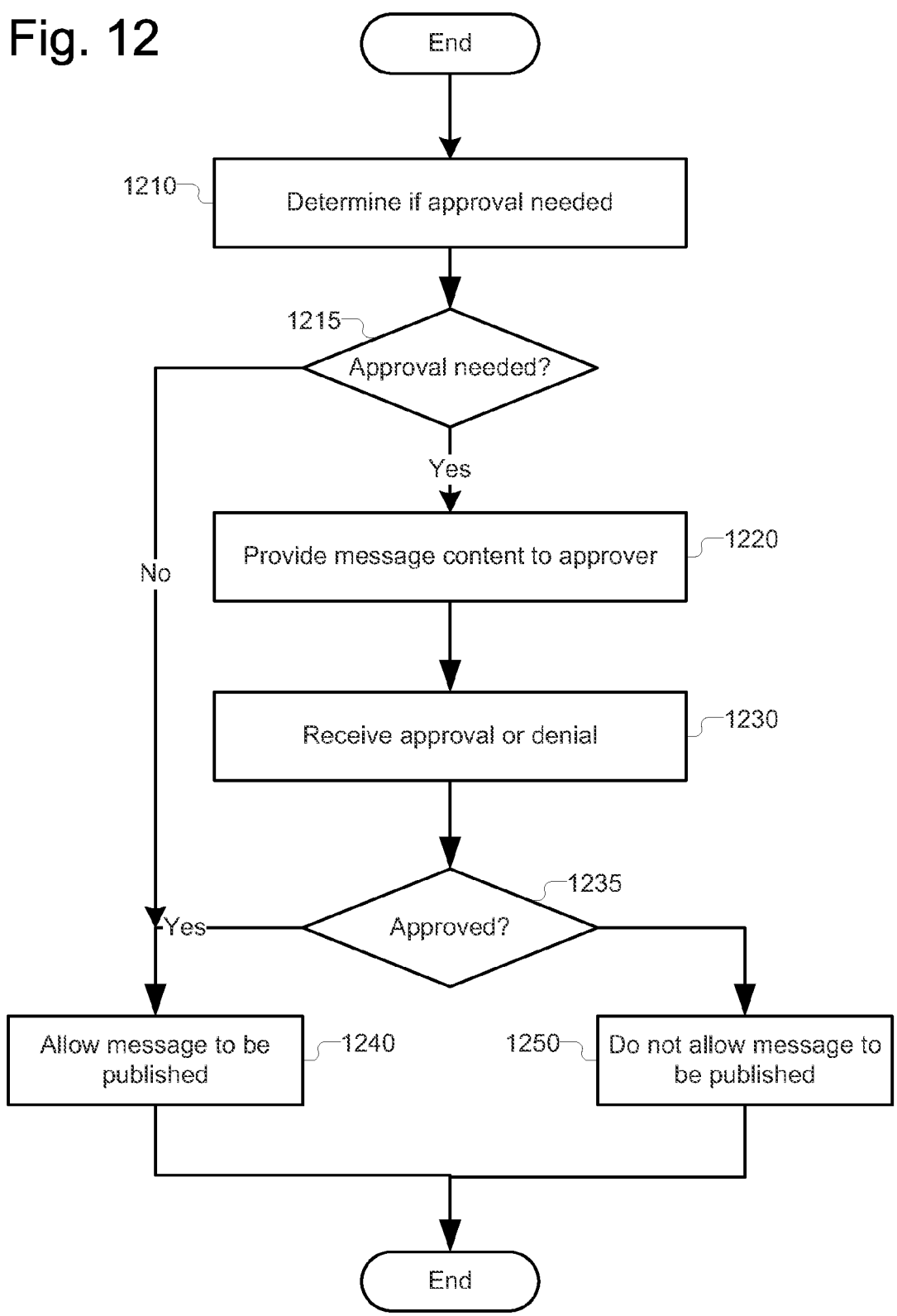
FIG. 12 illustrates an example process for obtaining message approval using the multi-point publication system in accordance with various embodiments.

FIG. 12 is a flowchart that illustrates examples various embodiments of a process 1200 for obtaining message approval using the multi-point publication system. While FIG. 12 illustrates a particular order of particular operations, in various embodiments, operations of FIG. 12 may be reordered, broken into additional operations, and/or omitted entirely. The process may begin at operation 1210 where the message management node may determine whether the received message content needs approval. In some embodiments, this determination may be performed based on the message content itself, such as by analysis of textual or image content, message content type, message size, etc. In other embodiments, the message management node may determine if approval is needed based on an identity of the content creator and/or an identity of one or more suggested recipients. In yet other embodiments, all or substantially all message content may be determined to need approval. If approval is not needed at decision operation 1215, then the process may proceed to allow the message to be published.

If, however, approval is needed at decision operation 1215, then the process may continue to operation 1220 where the message management node may provide the message content to the approver actor. In various embodiments, the message management node 404 may send or otherwise publish the message content to the approver 920. In other embodiments, the message management node 404 may provide an interface for the approver 920 to visit and view the message content, such as via a web-based interface and/or other interfaces described herein. In various embodiments, the message management node 404 may also provide a notification to the approver 920 to facilitate the approver's review of the message content. In various embodiments the interface may also facilitate the approver 920 in editing the message content before approving it. In various embodiments, the message management node 404 may provide the message content to a plurality of approvers 920. For example, message content may be sent through a cascade or sequence of multiple approvers. Thus, a message may be approved by a first approver 920 before being sent to a second approver 920, etc. In various embodiments, an approver at a particular place in the sequence may not be requested to provide approval until approval has been obtained at previous places in the sequence. In another example, message content may be provided in parallel to multiple approvers, and approval may be obtained if a pre-determined number of the approvers 920 approve the message content. In various embodiments, one or more approvers 920 may approve based on message content, content creator identity, or both.

Next, at operation 1230 the message management node 404 may receive an approval or denial from the approver 920. The approval or denial may be provided via various processes in various embodiments, and may including the sending of a separate message by the approver and/or indication in an interface as to whether the message content is approved or denied. If at decision operation 1235 the approver 920 has approved the message content, then at operation 1240 the message management node 404 may allow the message content to be published. If not, then at operation 1250 the message management node 404 may not allow the message content to be published. The process may then end.

Figure 13:
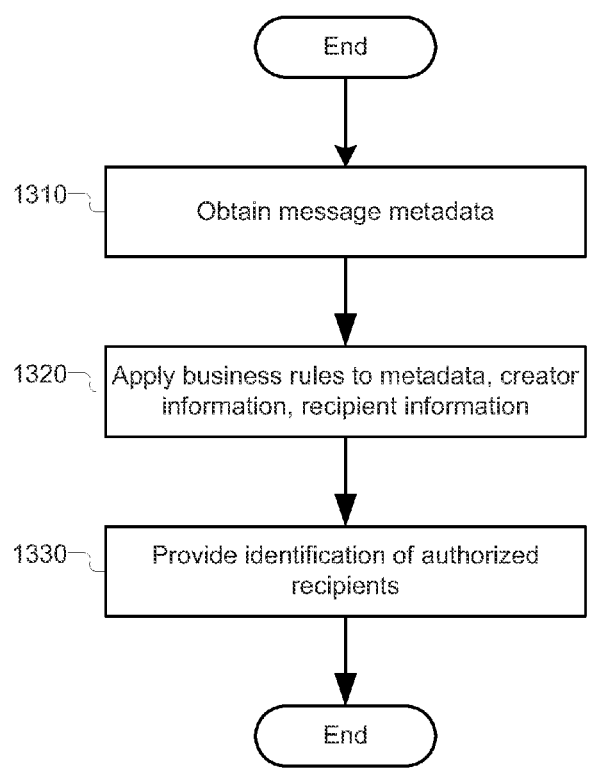
FIG. 13 illustrates an example process for identifying authorized recipients using the multi-point publication system in accordance with various embodiments.

FIG. 13 is a flowchart that illustrates examples various embodiments of a process 1300 for identifying authorized recipients using the multi-point publication system. While FIG. 13 illustrates a particular order of particular operations, in various embodiments, operations of FIG. 13 may be reordered, broken into additional operations, and/or omitted entirely. The process may begin at operation 1310 where the message management node may obtain message metadata from the message content. In various embodiments, the message metadata may include, but is not limited to: keywords, message type, message size, message structure, image data, etc. Next, the at operation 1320 message management node may apply the previously generated and/or modified business rules to the message metadata, received content creator information, and/or received recipient information to identify one or more recipients who should be authorized to receive the information. Next, at operation 1330 the message management node may provide identification of the authorized recipients. This identification may then be used to publish the message content, such as in the process of FIG. 10. The process may then end.

Although specific embodiments have been illustrated and described herein, it will be appreciated by those of ordinary skill in the art that a wide variety of alternate and/or equivalent implementations calculated to achieve the same purposes may be substituted for the specific embodiment shown. This application is intended to cover any adaptations or variations of the embodiments discussed herein.

What is claimed is:

1. A computer-implemented method for distributing content, the method comprising:
   receiving, by a computing device, message content from a content creator;
   determining, by the computing device, an authorized recipient to receive the message content based at least in part on applying one or more business rules to the message content and an identity of the content creator;
   modifying, based at least in part on identity or credentials of the authorized recipient, the message content to create modified message content;
   determining, by the computing device, one or more delivery channels for the modified message content;

facilitating, by the computing device, delivery of the modified message content via the one or more delivery channels to a computing device of the authorized recipient for provision to the authorized recipient, wherein facilitating delivery of the modified message content includes preventing delivery of the modified message content to one or more non-authorized persons; and modifying the one or more business rules based on information received about one or more previous publications provided to the authorized recipient.

2. The method of claim 1, further comprising:

providing, by the computing device, the message content to one or more approvers; and in response to receiving approval from the one or more approvers, performing, by the computing device, said determining of the authorized recipient and facilitating delivery of the modified message content.

3. The method of claim 2, wherein:

providing the modified message content to one or more approvers comprises providing the modified message content to one or more approvers in a sequence; and receiving approval comprises receiving approval from all approvers in the sequence.

4. The method of claim 2, wherein:

providing the modified message content to one or more approvers comprises providing the modified message content to one or more approvers in parallel; and receiving approval comprises receiving approval from a pre-determined number of the one or more approvers.

5. The method of claim 1, wherein determining the authorized recipient is based at least in part on one or more keywords and/or subject matter in the message content.

6. The method of claim 1, wherein determining the authorized recipient is based at least in part on one or more security authorizations of the authorized recipient.

7. The method of claim 1, wherein determining the authorized recipient comprises determining the recipient has requested the message content.

8. The method of claim 1, wherein facilitating delivery of the modified message content to the authorized recipient comprises delivering a message to the authorized recipient.

9. The method of claim 8, wherein the message is configured to confirm authentication of the authorized recipient before the message may be consumed.

10. The method of claim 1, wherein facilitating delivery of the message content to the authorized recipient comprises providing a publicly-available facility for consuming the modified message content.

11. One or more non-transitory computer-readable storage media comprising instructions configured, in response to executions of the instructions by a computing device, to cause the computing device to:

receive message content from a content creator;

determine an authorized recipient to receive the message content based at least in part on applying one or more business rules to the message content and an identity of the content creator;

modify, based at least in part on identity or credentials of the authorized recipient, the message content to create modified message content;

determine one or more delivery channels for the modified message content;

facilitate delivery of the modified message content via the one or more delivery channels to the authorized recipient, wherein facilitate delivery of the modified message content includes preventing delivery of the modified message content to one or more non-authorized persons; and modify the one or more business rules based on information received about one or more previous publications provided to the authorized recipient.

12. The non-transitory computer-readable storage media of claim 11, wherein the instructions are further configured to cause the computing device to:

provide the modified message content to one or more approvers; and in response to receipt of approval from the one or more approvers, perform said determine authorized recipient and facilitate delivery of the modified message content.

13. The non-transitory computer-readable storage media of claim 11, wherein determine authorized recipient is based at least in part on one or more keywords and/or subject matter in the message content and/or one or more security authorizations of the authorized recipient.

14. The non-transitory computer-readable storage media of claim 11, wherein facilitate delivery of the modified message content to the authorized recipient comprises deliver a message to the authorized recipient, wherein the message is configured to confirm authentication of the authorized recipient before the message may be consumed.

15. The one or more non-transitory computer-readable storage media of claim 11, wherein the information includes an indication that the one or more previous publications provided to the authorized recipient have failed one or more times and said modify the one or more business rules is to reduce a likelihood that additional publications are to be provided to the authorized recipient.

16. An apparatus, comprising:

one or more hardware-based computer processors; and one or more message content publication modules configured to operate on the one or more computer processors to:

receive message content from a content creator;

determine an authorized recipient to receive the message content based at least in part on applying one or more business rules to the message content and an identity of the content creator;

modify, based at least in part on identity or credentials of the authorized recipient, the message content to create modified message content;

determine one or more delivery channels for the message content;

facilitate delivery of the modified message content via the one or more delivery channels to the authorized recipient, wherein facilitating delivery of the modified message content includes preventing delivery of the modified message content to one or more non-authorized persons; and modify the one or more business rules based on information received about one or more previous publications provided to the authorized recipient.

17. The apparatus of claim 16, further comprising one or more approval modules configured to operate on the one or more hardware-based computer processors to:

provide the modified message content to one or more approvers; and in response to receipt of approval from the one or more approvers, perform said determine the authorized recipient and facilitate delivery of the modified message content.

18. The apparatus of claim 16, wherein determine the authorized recipient is based at least in part on one or more keywords and/or subject matter in the message content and/or one or more security authorizations of the authorized recipient.

19. The apparatus of claim 16, wherein facilitate delivery of the modified message content to the authorized recipient comprises deliver a message to the authorized recipients.

20. The apparatus of claim 16, wherein the information includes an indication that the one or more previous publications provided to the authorized recipient have failed one or more times and said modify the one or more business rules is to reduce a likelihood that additional publications are to be provided to the authorized recipient.

\* \* \* \* \*